United States Patent [19]
Albares

[11] Patent Number: 5,140,636
[45] Date of Patent: Aug. 18, 1992

[54] INTERFEROMETRIC OPTICAL FIBER DATA LINK

[75] Inventor: Donald J. Albares, San Diego, Calif.

[73] Assignee: The United States of America as represented by the Secretary of the Navy, Washington, D.C.

[21] Appl. No.: 789,046

[22] Filed: May 2, 1985

[51] Int. Cl.$^5$ .............................................. H04B 9/00
[52] U.S. Cl. ........................................ 380/54; 380/59
[58] Field of Search ...................... 455/26, 612; 324/96; 178/22.01; 380/54, 59

[56] References Cited

U.S. PATENT DOCUMENTS

| | | | |
|---|---|---|---|
| 4,000,416 | 12/1976 | Goell | 455/612 |
| 4,174,149 | 11/1979 | Rupp | 455/612 |
| 4,207,561 | 6/1980 | Steensma | 455/612 |
| 4,211,468 | 7/1980 | Steensma | 455/612 |
| 4,217,488 | 8/1980 | Hubbard | 455/612 |
| 4,376,248 | 3/1983 | Giallorenzi et al. | 324/96 |
| 4,378,497 | 3/1983 | Giallorenzi et al. | 324/96 |
| 4,399,565 | 8/1983 | Jarret et al. | 455/612 |
| 4,435,850 | 3/1984 | Bowen et al. | 455/612 |
| 4,493,114 | 1/1985 | Czeller et al. | 455/617 |
| 4,561,119 | 12/1985 | Epworth | 455/617 |

OTHER PUBLICATIONS

Electro-Optics/Laser International '76 UK–"An Optical Fibre Data Collection Highway"–D. E. N. Davies and S. A. Kingsley (copy attached hereto).

*Primary Examiner*—Salvatore Cangialosi
*Attorney, Agent, or Firm*—Harvey Fendelman; Thomas Glenn Keough

[57] ABSTRACT

An apparatus for a method for assuring the secure transmission of information between a transmitter and a receiver is fabricated along the lines of a Mach-Zehnder interferometer. Two, identical length single-mode fibers extend between the transmitter and receiver to act as transmission paths. Within the transmitter a coiled length of like single-mode fiber integrally extends from one of the fibers reaching from the transmitter to the receiver. Within the receiver a like length of like single-mode fiber integrally extends from the other end of the other fiber reaching from the transmitter to the receiver. A superradiant diode in the transmitter emits pulses of coherent wavetrains that are split and sent through the two lengths of fibers and their associated integrally connected coils. A detector in the receiver senses variations in the interference fringes when a modulator in the transmitter shifts in path length the coherent wavetrains in one of the fibers in accordance with the information desired to be transmitted. Because of the integrally extending coils in the transmitter and the receiver, an intruder to the system would be unable to find where the transmission paths are identical and hence would be unable to monitor the modulated interference fringe patterns.

14 Claims, 1 Drawing Sheet

| Spectrum $I(\sigma-\sigma_0)$ | Visibility $V(\delta)$ |
|---|---|
| Monochromatic $I$ | 1 |
| Lorentzian $\dfrac{\epsilon}{(\sigma-\sigma_0)^2+\epsilon^2}$ | $\exp[-2\pi\epsilon|\delta|]$ |
| Gaussian $\exp[-\alpha^2(\sigma-\sigma_0)^2]$ | $\exp[-(\delta/2\alpha)^2]$ |

5,140,636

INTERFEROMETRIC OPTICAL FIBER DATA LINK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Most classified messages have been sent encoded using a variety of cryptographic coding techniques. These techniques, while usually offering high levels of security, tend to be costly, require elaborate equipments and must have appropriately qualified personnel to operate them effectively. Over the years a variety of devices and methods have been tried to reduce the inherent drawbacks attendant the transmission of classified information among which would be the relieving of the expensive life-cycle cost and complexity of cryptography for certain levels of message classification.

Recent innovations in providing for secure transmissions have relied upon optical fibers and associated equipments. A fiber disclosed in U.S. Pat. No. 4,000,416 provides for a multipath optical communication system within a single fiber. Information is transmitted in an inner core and an outer core transmit a security signal, any interruption thereof alerts to an intrusion. The fiberoptic communication system of U.S. Pat. No. 4,174,149 sends information and an alarm signal within a frangible fiber that provides an indication of an intrusion. The system of U.S. Pat. No. 4,207,561 injects an intelligence modulated beam into an optical waveguide via a beamsplitter and delays a replica portion, a time equivalent to the transmission time through a waveguide and later correlates it to determine an indication of interception of the information through the waveguide. The secure optical communication system of U.S. Pat. No. 4,211,468 launches information along with masking signals at different angles into an optical waveguide to assure a secure communication capability. The secure system of U.S. Pat. No. 4,217,488 has optical fibers reaching between a transmitter and receiver carrying information as well as guard signals each discreetly sent on separate fibers reaching between two terminals.

Thus there is a continuing need in the state-of-the-art for a secure communication system that advantageously includes the benefits of single-mode fiber technology for providing a low-cost, highly secure communication system not requiring unduly special equipments or operator training for its successful operation.

SUMMARY OF THE INVENTION

The present invention is directed to providing an apparatus and method for securing the transmission of information between a transmitter and a receiver. Two equal length optical information transmission paths in the form of single-mode fibers reach between a transmitter and a receiver. Integrally extending from one of the single-mode fibers a coil of like fiber is located in the transmitter and a like coil of identical length integrally extends from the other single-mode fiber at the receiver. A single, superradiant diode operating CW emits a continuous stream of coherent wavetrains of light that are split by a beamsplitter and sent through the two optical fibers and their associated integrally connected coils. A detector in the receiver notes changes in the interference pattern when a modulator in the transmitter operatively associated with one of the fibers or its coil effects a phase change of the emitted wavetrains in one interconnected transmission fiber and its coil. Since the system functions as a Mach-Zehnder interferometer, an intruder could not detect the interference fringe variations attributed to the information since it would be very difficult to find where the two transmission path lengths are equal. Since the two transmission paths also could be widely separated one from the other, interception of the information is highly unlikely.

The prime object of the invention is to provide a secure communication system.

Another object of the invention is to provide a secure communication system that does not require elaborate equipments or other safeguards normally associated with secure communication transmission systems.

Yet another object of the invention is to provide a highly reliable secure communication system using a pair of single-mode fibers reaching between a transmitter and a receiver.

Still another object is to provide a reliable communication system having a coil of single-mode fibers in the transmitter integrally joined and extending to a first single-mode fiber transmission path and a second coil of single-mode fiber in a receiver integrally connected to and extending from a second single-mode fiber transmission path reaching to the transmitter that assure the transmission of information via modulations of the interference fringes at a detector in the receiver.

Still a further object is to provide a secure communication system relying on the change of effective path length in one of two transmission paths extending between a transmitter and a receiver to transmit information therebetween and to guard against intrusion by the inclusion of two extensions of the transmission paths, one in the transmitter and one in the receiver.

These and other objects of the invention will become more readily apparent from the ensuing specification and drawings when taken in conjunction with the appended claims.

DESCRIPTION OF THE PREFERRED EMBODIMENT

Figures 1, 2:
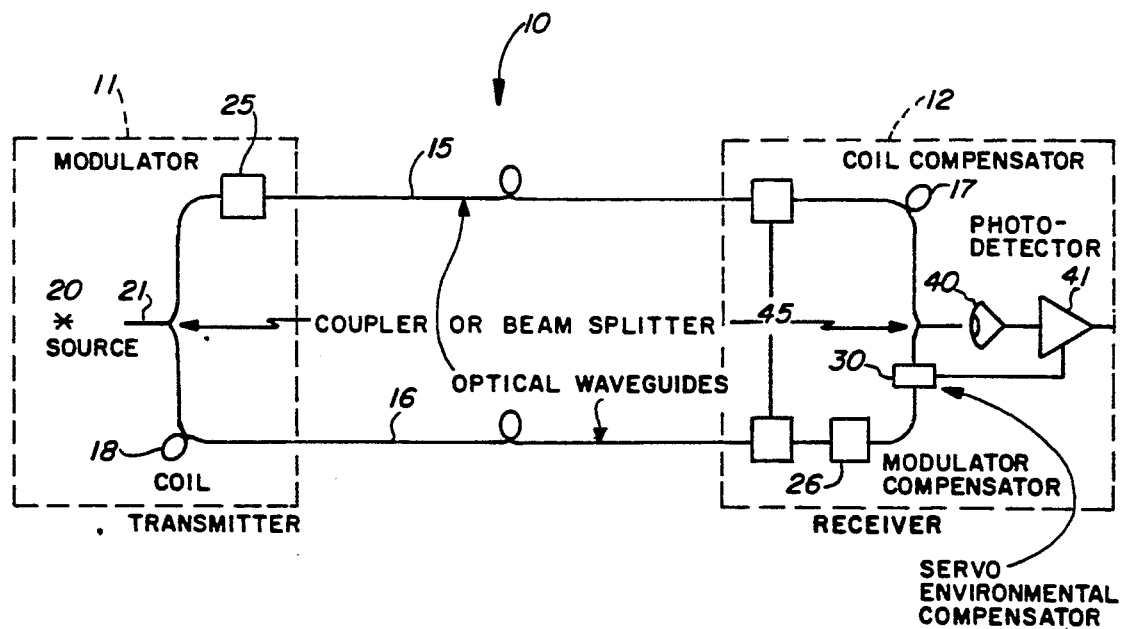
FIG. 1 depicts two spectral profiles and associated visibility curves of signals associated with this inventive concept.
FIG. 2 sets forth a schematic embodiment of this inventive concept.

Before the apparatus of this inventive concept is discussed in detail, familiarization with the relevant theory will allow a better understanding of the salient features of this invention. This invention stems from principles of two-beam interference of partially coherent light; as the path length difference $\delta$ in the two arms is increased from 0, the sinusoidal variation in fringe intensity forms the interferogram $I(\delta)$. This quality is also the autocorrelation function of the electric field amplitude as a function of $\delta$. A two-beam interferometer, such as the Mach-Zehnder configuration used here, illuminated by white light, incoherent light produces fringes when $\delta$ is nearly 0. As $\delta$ increases, the fringe visibility V decreases rapidly in the case of a broad spectral source, and more slowly with a narrowband spectral source until the monochromatic case is reached where V remains constant with $\delta$, or, in other words, there are no diminishing interfering fringes with a monochromatic source.

The fringe visibility is defined by:

$$V = \frac{I_{max} - I_{min}}{I_{max} + I_{min}}$$

where $I_{max}$ and $I_{min}$ are the intensities at the maximum and minimum of the interferogram $I(\delta)$.

This condition arises since $V(\delta)$ is the Fourier transform of the source spectral intensity distribution $I(\sigma)$, where $\sigma = 1/\lambda$. In the interferometer at $\delta = 0$, each frequency component is in phase, forming the white light fringes. As $\delta$ increases each set of fringes formed by the monochromatic or Fourier component of the light undergoes a shift relative to the others until they overlap superimposing maxima and minima rendering $V = 0$.

An equivalent view is that the source emits a random series of finite-length wavetrains, each is divided in the interferometer and recombined after traversing the two paths. If $\delta$ exceeds the length $\Delta l$ of a wavetrain, then the divided pair do not overlap and therefore lack coherence to form fringes and $V = 0$. Conversely if $\delta$ is much less than $\Delta l$, the combining pair originate from the same wavetrain, therefore are coherent, and produce interference ($V = 1$). For the case where $\delta$ is approximately equal or slightly less than $\Delta l$, $V$ assumes intermediate values between 0 and $\Delta l$. In terms of the Fourier spectrum, the wave packets (wavetrains) or coherence length $\Delta l = c\Delta t \sim c/\Delta v$, where $\Delta t$ is termed the coherence time, $\Delta v$ is the spectral width and where $v$ is the optical frequency.

Two spectral profiles of importance are the Lorentzian and the Gaussian, both resulting in visibility curves decreasing monotonically with $\delta$. These profiles and associated (Fourier transform) visibility curves are given in FIG. 1 of the drawings along with the monochromatic case.

In the case of equal beam intensities: $I(\delta) = V(\delta) \cos 2\pi\sigma_o\delta$ the semiconductor laser diode shows the Lorentzian spectrum as fully explained by E. D. Hinkley and C. Freed in their article entitled "Direct Observation of the Lorentzian Line Shape as Limited by Quantum Phase Noise in a Laser Above Threshold", (*Physics Review Letters* 23, 277, 1969). The gas laser and the super luminescent diode have been found to exhibit the Gaussian spectrum as developed by A. E. Siegman, B. Daino and K. R. Manes in their article entitled "Preliminary Measurements of Laser Short-Term Frequency Fluctuations", *IEEE J. Quantum Electron QE*-3, 180 1967 and W. K. Burns and R. P. Moeller in their article entitled "Measurement of Polarization Mode Dispersion in High-Birefringence Fibers", *Optics Letters* 8, 195 (1983).

In view of the foregoing and referring now to FIG. 2 of the drawings an intrusion resistant communication system 10 is fabricated to assure the secure transmission of information between a transmitter 11 and a receiver 12. A pair of optical waveguides 15 and 16 extend between the transmitter and receiver and serve as the optical conduits or transmission paths for the transmission of information. The waveguides, preferably single-mode fibers, may lie close together or be separated a considerable distance to further frustrate an attempted undesired intrusion. In either case the length of the two waveguides is identical.

Within transmitter 11 a coil 18 is located and coupled to waveguide 16. In the receiver another coil 17 is located and coupled to waveguide 15. Both of the coils are of like material as the waveguides and in this case are substantially identical single-mode fibers. Preferably they integrally extend with respect to their associated waveguide so that there are no splits, breaks or other discontinuities which might affect the signal performance. The total length of a waveguide and its coil must equal the length of the other waveguide and its coil for the operation of this inventive concept.

Within transmitter 11 a source 20 emits coherent wavetrains of light at a given coherence length. A superradiant diode has been found to be highly desirable for this application although other light emitting diodes are capable of functioning satisfactorily. A typical superradiant diode is a General Optronics Model G0 60. A monochromatic source is to be avoided for the reasons set out above. The source has a coherence length of a spectral width $\Delta\lambda$. The coherence length of the source of spectral width $\Delta\lambda$ is $\Delta^2/\Delta\lambda$ so that a light emitting diode at a $\lambda$ of 0.83 microns and a $\Delta\lambda = 0.05$ microns, the coherence length $l = 14$ microns. In the case of a superradiant diode having a $\lambda = 0.83$ microns and a $\Delta\lambda = 0.02$ microns, it has a coherence length $l = 34$ microns.

The coherence length has been defined as being a function of the Fourier spectrum and the effective frequency range of the Fourier spectrum is in the order of the reciprocal of the duration of a single wave train, or $\Delta t$. This is generally known as being the coherence time of that light such that the coherence length is a readily measureable identified quantity. A more thorough analysis of these parameters is set forth on pages 316-320 Chapter 7 in the text *Principles of Optics* by Max Born and Emil Wolf, Paragon Press 6th Edition 1980. In this regard, the phenomena associated with interference such as that relied upon in the practice of this inventive concept is set forth technically in Chapter 10 of this text.

A beamsplitter 21 receives the sequential emitted light wavetrains from superradiant diode 20 and amplitude splits each of them for transmission through optical transmission paths 15 and 16. A modulator 25 is included in one or the other of the transmission paths, in this case it is shown in path 15, within the transmitter to effect modulation of the emitted light wavetrains. The modulation is largely accomplished by phase or path length modulation to create what can be referred to as a perceived path length change and can be done by a moving mirror, for example, or by a retroreflector, by elastooptic means such as stretching or compressing a fiber with piezoelectric forms, by the electrooptic effect, by thermal effects and so on. These techniques are many and varied in the state-of-the-art and further elaboration in this regard is felt to unnecessarily belabor the obvious.

The modulation techniques can be selected according to the required modulation amplitude, bandwidth, power required and so on. Note that the modulation technique does not introduce intensity modulation since an intensity modulated signal could be detected directly. The modulation phase-shifts the wavetrains or path length modulates them. Were it otherwise, that is, if the intensity of the signal were modulated, an intruder merely would rely upon a standard intensity detector or homodyne detection technique that could be applied anywhere for demodulation of the signal; however, this is not the case in the present invention.

Since there is a break or increase in the path length caused by the introduction of modulator 25, then a corresponding break or increase in the other arm of the transmission path must be provided for to assure an equal length transmission path to the receiver. For this reason, a modulation compensator 26 of similar material and length as modulator 25 is introduced in the receiver to account for physical compensating for the dimension of the modulator; however, the modulation compensator may not be necessary where there is no break increase in path length introduced in the other path by inclusion of modulator 25. The modulation compensator does not modulate the wavetrains. Its inclusion is solely to compensate for the space taken by the modulator.

Within the receiver a system compensator element 30 may be useful. This compensator is included to account for the relative path length perturbations that generally range through the acoustic frequency spectrum, for example less than 10 kHz, that depend upon the environment. These environment perturbations are attributed to vibrations, shock, temperature, acceleration and the like and will show up at a detector 40 when the system is at rest. When such signals are detected, an operatively associated feedback amplifier 41 can provide corrective signals to the compensator to reestablish the system at a null or stable 0 datum condition. In this regard the compensator may use elastooptic means such as using a piezoelectric form to stretch or compress a fiber or well known electrooptic effects or thermal effects and the like. One or more of these effects may be applied to track out the environmental perturbations and maintain fringe visibility monitored at photodetector 40 and is accomplished by dithering the path lengths by sampling the visibility response and applying a correction via operational amplifier feedback circuit 41.

The modulation of the system occurs in two regimes. The first being on the scale of 1/10th of a wavelength (0.6 radians of phase) whereby such a phase modulation applied in one arm or path will result in intensity modulation at the receiver where the two beams are superimposed. A more preferred second regime is on the scale of the coherence length (the manner selected in the preferred embodiment) in which path changes would produce variations in the wavetrains of the interference fringes or the fringe visibility. The modulation in path length would be on the scale of about ten wavelengths for a super luminescent diode, for example.

Another feature that is added to the system is the monitoring of power needed to limit the amount of power an intruder could tap off without actuating an alarm. A total power monitoring device could measure the level of both fibers combined. The photodetector output could be used for this function. For greater sensitivity a differential monitoring system is attractive for this system in which both arms are measured and balanced against each other. This forces an intruder to take greater care to tap both arms at once in order to maintain power balance to a high degree. In addition the power level of each arm can be monitored separately. The power monitors have been schematically depicted as elements 45 in the receiver although their arrangement and location could vary as desired.

Obviously many modifications and variations of the present invention are possible in the light of the above teachings. It is therefore to be understood that within the scope of the appended claims the invention may be practiced otherwise than as specifically described.

I claim:

1. An apparatus for the secure transmission of information between a transmitter and a receiver comprising:

means for providing a first and a second optical transmission path reaching between the transmitter and the receiver;

first means disposed in the transmitter integral with the first optical transmission path providing means for extending the length thereof a predetermined amount;

second means disposed in the receiver integral with the second optical transmission path providing means for extending the length thereof an amount equal to the predetermined amount of the length of the first optical transmission path extending means, the first optical transmission path providing means along with the first optical transmission path extending means and the second optical transmission path providing means along with the second optical transmission path extending means being equal in length and functionally cooperating as the balanced arms of a Mach-Zehnder interferometer;

means disposed in the transmitter optically coupled to the first optical transmission path extending means and the second optical transmission path providing means for simultaneously emitting wavetrains of light other than monochromatic, and having a given coherence length therethrough;

means provided in the transmitter interposed between the emitting means and the first optical transmission path extending means and the second optical transmission path providing means for amplitude splitting the wavetrains of light from the emitting means therebetween;

means provided in the transmitter optically coupled to the second optical transmission path providing means for modulating in perceived path length the wavetrains of light in correspondence with information; and means disposed in the receiver optically coupled to the first optical transmission path providing means and the second optical transmission path extending means for detecting interference fringe variations corresponding to the information modulations so as to make interference fringe variations discernable only where the functional Mach-Zehnder arms are of equal length to make unlikely an undesirable intrusion and interception.

2. An apparatus according to claim 1 further including:

means in the receiver coupled to the first optical transmission path providing means for compensating for environmental effects on the apparatus of the system.

3. An apparatus according to claim 2 in which the first and second optical transmission path providing means are two like lengths of single-mode fiber.

4. An apparatus according to claim 3 further including:

means provided in the receiver optically coupled in the first optical transmission path for physically compensating for the dimension of the information modulating means.

5. An apparatus according to claim 4 in which the first and second optical transmission path extending means are like lengths of coiled single-mode fiber each integrally extending from the like lengths of single mode fiber forming the first and second optical transmission path providing means.

6. An apparatus according to claim 5 in which the emitting means is a light emitting diode.

7. An apparatus according to claim 6 in which the light emitting diode is a superradiant diode.

8. An apparatus according to claim 7 in which the modulating means and the compensating means are elastooptic that optionally stretch or compress a fiber with piezoelectric forms.

9. An apparatus according to claim 7 in which the modulating means and the compensating means are devices functioning in accordance with an electrooptic effect.

10. An apparatus according to claim 8 in which the modulating means and the compensating means are devices functioning in accordance with a thermal effect.

11. A method for securing the transmission of information between a transmitter and a receiver comprising:
   providing two equal length optical information transmission paths between the transmitter and the receiver;
   integrally extending a first one of the paths at the transmitter;
   integrally extending the other path a distance equal of the extension of the first path at the receiver, the path and extensions functionally forming two arms of a Mach-Zehnder interferometer;
   simultaneously transmitting the same wavetrains of light over both paths and their extensions;
   modulating the wavetrains of light in one of the paths by changing the apparent optical path length; and
   detecting the interference fringes at the end of the one path and the extension integrally extending from the other path in the receiver to determine the information content of the transmission.

12. A method according to claim 11 in which the step of simultaneously transmitting includes the emitting of wavetrains of light and the splitting of the emitted wavetrains into one of the paths and the extension of the other path.

13. A method according to claim 12 further including:
   compensating for environmental effects in the paths and extensions at the receiver.

14. A method according to claim 13 further including:
   physically compensating in one path for the space attributed to a modulator in the step of modulating in the other path.

* * * * *